United States Patent
Chambers et al.

(10) Patent No.: US 12,047,382 B2
(45) Date of Patent: Jul. 23, 2024

(54) METHOD FOR AUTOMATICALLY APPLYING ACCESS CONTROL POLICIES BASED ON DEVICE TYPES OF NETWORKED COMPUTING DEVICES

(71) Applicant: Cisco Technology, Inc., San Jose, CA (US)

(72) Inventors: Benjamin A. Chambers, San Francisco, CA (US); John Bicket, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 16/904,929

(22) Filed: Jun. 18, 2020

(65) Prior Publication Data

US 2020/0322344 A1 Oct. 8, 2020

Related U.S. Application Data

(63) Continuation of application No. 14/928,099, filed on Oct. 30, 2015, now Pat. No. 10,701,078, which is a
(Continued)

(51) Int. Cl.
*H04L 29/06* (2006.01)
*H04L 9/40* (2022.01)
(Continued)

(52) U.S. Cl.
CPC ........ *H04L 63/102* (2013.01); *H04L 41/0803* (2013.01); *H04L 41/0809* (2013.01);
(Continued)

(58) Field of Classification Search
CPC ............... H04L 63/102; H04L 41/0803; H04L 41/0809; H04L 41/0893; H04L 41/28;
(Continued)

(56) References Cited

U.S. PATENT DOCUMENTS 6,085,191 A 7/2000 Fisher et al.
6,611,863 B1 * 8/2003 Banginwar ............. H04L 41/12
709/223

(Continued)

FOREIGN PATENT DOCUMENTS

CA 2828093 A1 * 8/2012 ............. H04L 12/12
EP 1091522 A2 * 4/2001 ......... H04L 41/0809
(Continued)

*Primary Examiner* — Richard A McCoy
(74) *Attorney, Agent, or Firm* — Polsinelli P.C.

(57) ABSTRACT

Techniques for managing access control policies are described herein. According to one embodiment, access control policies (ACPs) and access control rules (ACRs) are downloaded from a management server to a network access device (NAD) over the Internet, where the network access device is one of a plurality of network access devices managed by the management server over the Internet. In response to a request from a network client device for entering a network, a device type of the network client device is detected and an ACP identifier is determined based on the device type using the ACRs An ACP is selected from the ACPs based on the ACP identifier and enforced against the network client device. At least the selected ACP is reported to the management server to distribute the selected ACP to other network access devices.

20 Claims, 13 Drawing Sheets

Related U.S. Application Data continuation of application No. 14/011,519, filed on Aug. 27, 2013, now Pat. No. 9,197,498.

(60) Provisional application No. 61/696,000, filed on Aug. 31, 2012.

(51) Int. Cl.
*H04L 41/0803* (2022.01)
*H04L 41/0806* (2022.01)
*H04L 41/0893* (2022.01)
*H04L 41/28* (2022.01)
*H04L 67/01* (2022.01)
*H04L 67/02* (2022.01)

(52) U.S. Cl.
CPC .......... *H04L 41/0893* (2013.01); *H04L 41/28* (2013.01); *H04L 63/0876* (2013.01); *H04L 63/20* (2013.01); *H04L 67/01* (2022.05); *H04L 67/02* (2013.01)

(58) Field of Classification Search
CPC ..... H04L 63/0876; H04L 63/20; H04L 67/02; H04L 67/42
See application file for complete search history.

(56) References Cited

U.S. PATENT DOCUMENTS

| | | |
|---|---|---|
| 7,069,433 B1 | 6/2006 | Henry et al. |
| 7,512,970 B2 | 3/2009 | Naftali et al. |
| 7,530,112 B2 | 5/2009 | Smith |
| 7,636,750 B2 | 12/2009 | Haldar |
| 7,657,744 B2 | 2/2010 | Kok |
| 7,793,336 B2 | 9/2010 | Salowey et al. |
| 8,065,712 B1 | 11/2011 | Cheng et al. |
| 8,156,325 B2 | 4/2012 | Convery et al. |
| 8,407,464 B2 | 5/2013 | Salowey et al. |
| 8,893,216 B2 | 11/2014 | Yadav et al. |
| 9,088,634 B1 | 7/2015 | Corley et al. |
| 9,154,484 B2 | 10/2015 | Wing et al. |
| 9,197,980 B2 | 11/2015 | Pazhyannur et al. |
| 9,436,820 B1 | 9/2016 | Gleichauf et al. |
| 2002/0129103 A1 | 9/2002 | Birkler et al. |
| 2002/0178377 A1 | 11/2002 | Hemsath et al. |
| 2003/0051017 A1* | 3/2003 | Choi ............... H04L 67/12 709/245 |
| 2004/0090930 A1 | 5/2004 | Lee et al. |
| 2004/0123329 A1* | 6/2004 | Williams ............ H04N 7/17309 725/111 |
| 2005/0050010 A1 | 3/2005 | Linden |
| 2005/0076030 A1 | 4/2005 | Hada et al. |
| 2005/0149759 A1 | 7/2005 | Vishwanath et al. |
| 2005/0277420 A1 | 12/2005 | Shin et al. |
| 2006/0090196 A1 | 4/2006 | van Bemmel et al. |
| 2006/0206931 A1 | 9/2006 | Dillaway et al. |
| 2006/0259759 A1 | 11/2006 | Miano et al. |
| 2006/0274774 A1* | 12/2006 | Srinivasan ......... H04L 41/0809 370/254 |
| 2007/0289006 A1 | 12/2007 | Ramachandran et al. |
| 2008/0066175 A1 | 3/2008 | Dillaway et al. |
| 2008/0141339 A1 | 6/2008 | Gomez et al. |
| 2008/0181138 A1 | 7/2008 | Dalberg |
| 2008/0244703 A1 | 10/2008 | Takahashi |
| 2008/0244741 A1* | 10/2008 | Gustafson ............... H04L 63/20 726/23 |
| 2009/0249458 A1 | 10/2009 | Banga et al. |
| 2010/0023997 A1 | 1/2010 | Hu et al. |
| 2011/0030045 A1 | 2/2011 | Beauregard et al. |
| 2011/0202751 A1 | 8/2011 | Kim et al. |
| 2011/0243065 A1* | 10/2011 | Sarma ................ H04W 40/248 370/328 |
| 2011/0270920 A1 | 11/2011 | Wang et al. |
| 2012/0023217 A1 | 1/2012 | Wakumoto |
| 2012/0047554 A1 | 2/2012 | Mihara et al. |
| 2012/0096094 A1 | 4/2012 | So et al. |
| 2012/0120834 A1* | 5/2012 | Sugar .................... G01S 5/0215 370/252 |
| 2012/0197980 A1 | 8/2012 | Terleski et al. |
| 2012/0216244 A1 | 8/2012 | Kumar et al. |
| 2013/0111541 A1 | 5/2013 | Yin et al. |
| 2014/0053227 A1 | 2/2014 | Ruppin et al. |

FOREIGN PATENT DOCUMENTS

| | | | | |
|---|---|---|---|---|
| EP | 1191744 B1 * | 5/2006 | ......... | H04L 41/0253 |
| WO | WO-2009110968 A1 * | 9/2009 | ............... | G06F 8/60 |

\* cited by examiner

ACR Log 500

| version | operation | MAC address | policy | expiration |
|---|---|---|---|---|
| 100 | add | 00:00:01:02:03:04 | policy_id 105 | never |
| 101 | add | 00:00:01:02:03:05 | policy_id 105 | 2020/4/20 12:00 |
| 102 | delete | 00:00:01:02:03:04 | | |
| 103 | add | 00:00:01:02:03:06 | policy_id 110 | never |

FIG. 5

METHOD FOR AUTOMATICALLY APPLYING ACCESS CONTROL POLICIES BASED ON DEVICE TYPES OF NETWORKED COMPUTING DEVICES

RELATED APPLICATIONS

This application is a continuation of U.S. patent application Ser. No. 14/928,099 filed on Oct. 30, 2015, which is a continuation of U.S. patent application Ser. No. 14/011,519 filed on Aug. 27, 2013, which claims the benefit of U.S. Provisional Patent Application Ser. No. 61/696,000 filed Aug. 31, 2012, the contents of which are incorporated herein by reference in their entireties.

FIELD OF THE INVENTION

Embodiments of the present invention relate generally to networking. More particularly, embodiments of the invention relate to automatically applying access control policies based on device types of networked computing devices.

BACKGROUND

A physical local area network (LAN) may include numerous network access devices (e.g., routers, switches, wireless access points, etc.) that communicate with one another (either directly or indirectly) to provide computing device(s) (e.g., laptop, smartphone, etc.) access to a wide area network (WAN). Thus, a network access device (NAD) is a piece of networking equipment, including hardware and software, which communicatively interconnects other equipment on the LAN (e.g., other network elements, computing devices). The WAN can include, for example, the Internet, where communication with the WAN is through an interface such as T1, T3, cable, Digital Subscriber Line (DSL), wireless (e.g., mobile cell tower), or the like.

The one or more of the network access devices within the LAN that are directly coupled to the WAN or directly coupled to an interface device (e.g., a DSL modem) act as a gateway node for the LAN (a gateway to the WAN) for the other network access devices and network computing devices in the LAN. Network access devices that rely on (communicate with) one or more other network access devices to reach the WAN act as intermediate nodes of the LAN.

Generally the access control rules must either be configured manually on each network access device (e.g. individual access points or switches), or if a controller based system is used then the rules are configured on the controller. Configuring access control rules manually on each network access device is cumbersome, time-consuming and error-prone. Using a controller-based system simplifies this somewhat, but controllers are expensive and can only support a limited number of network access devices each, after which additional controllers must be deployed and access control rules synchronized between them. Also, if many network access devices are located in geographically disparate locations, synchronizing the access control rules can be confusing.

Some network equipment manufacturers allow assignment of access policy based only on dynamic host configuration protocol (DHCP) fingerprinting of the networked computing device. Essentially, one can set rules so that a device that uses a particular set of DHCP options will be automatically assigned to a specific "role" (access policy). This configuration must be done manually using the command-line interface on the network access device controller. Such a configuration is complex and error-prone. In order to set a policy assignment rule, the user must know the "magic" DHCP fingerprint string for the device type they wish to assign policies for. They must then log into the controller via command-line interface and type commands to manually configure each rule. Policy assignment is based entirely upon DHCP fingerprint. This is not an entirely reliable way of determining device type, as sometimes a number of different types of devices may use the same combination of DHCP options. Policy assignment is fixed on low level details rather than a high level description that can be implemented differently over time. For instance, if Apple devices started using different DHCP options, it would be necessary to manually reconfigure the existing solutions.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating a data structure representing an access control log according to one embodiment of the invention.

DETAILED DESCRIPTION

Figure 1:
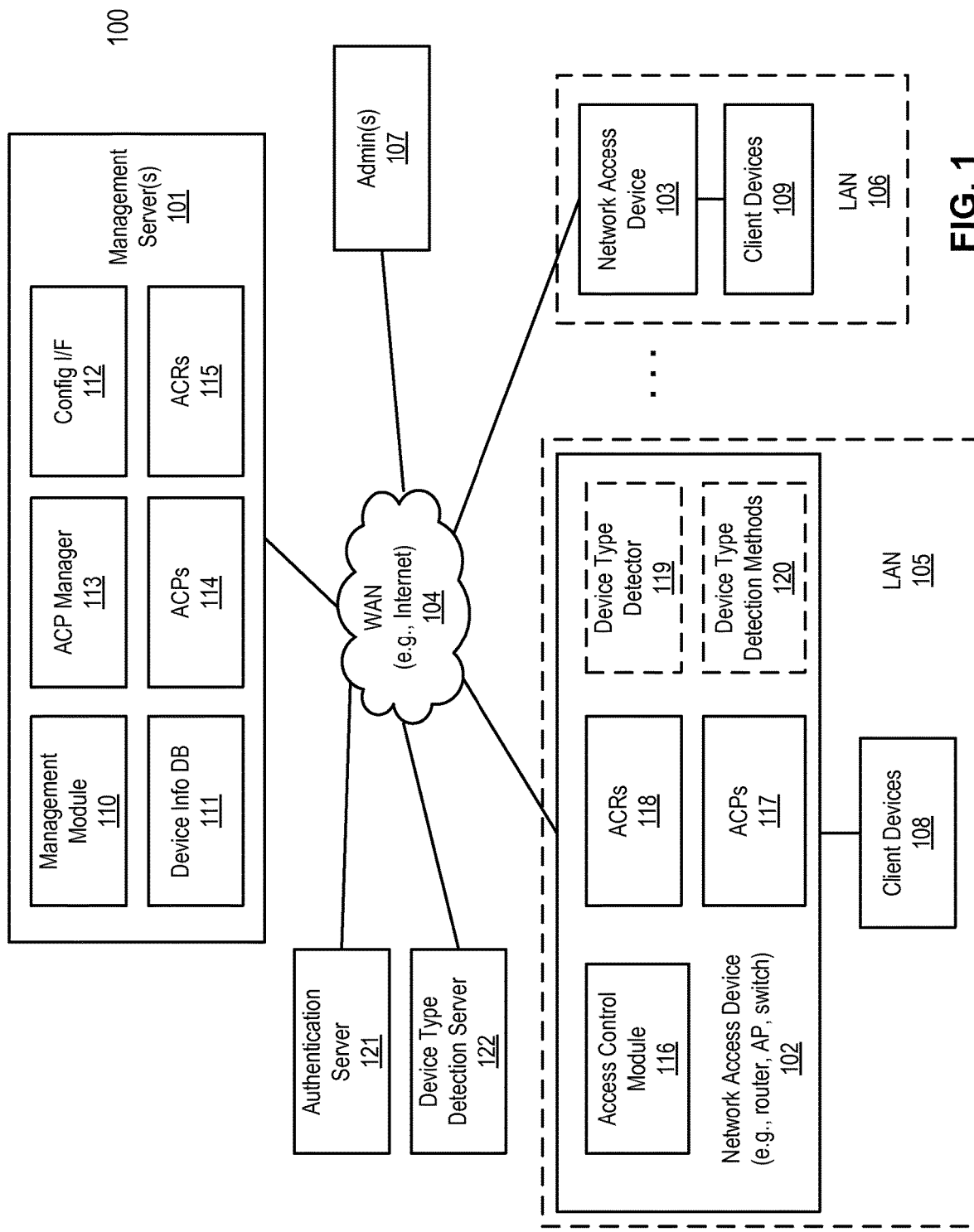
FIG. 1 is a block diagram illustrating a cloud managed network system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for automatically assigning access control policies (ACPs) based on device types of network client devices (NCDs) are described herein. According to some embodiments, a system for automatically applying a network access control policy to a network client device (also referred to as a networked computing device) is based on characteristics of the device itself, e.g. the device manufacturer or its operating system. The system automates all of the device identification mechanisms, so all the network administrator needs to do is specify a device type (e.g. "Apple iPhone") and which access policy should be applied. When a network device first connects to the network, it is examined by the system, identified by type, and assigned an access policy according to the specified rules for that device type.

According to one embodiment, the invention provides a system for the automatic assignment of access control policies to networked computing devices in wireless or wired networks. For example, when using the system, the network administrator can simply select the type of device (e.g. "Android smart phone" or "Apple iPhone") from a drop-down list, and then select which pre-defined access control policy they want to apply to that type of device.

The system then automates the identification of devices by type as well as the assignment of an access control policy based on that type. When a networked computing device connects to the network, according to one embodiment, the system analyzes network traffic in order to identify the type of device. Device identification is done behind the scenes using multiple methods including DHCP fingerprinting, extracting User-Agent headers from HTTP traffic, and determining manufacturer information from OUI lookup in the MAC address, etc. This data is combined to identify which type of device is connecting. Based on the type of device and the configuration specified by the network administrator, the system may then automatically apply an appropriate access control policy or rule.

FIG. 1 is a block diagram illustrating a cloud managed network system according to one embodiment of the invention. Referring to FIG. 1, system 100 includes, but is not limited to, various network access devices (NADs) 102-103 (which may be wired and/or wireless) managed by a management server (MS) 101 over WAN 104. Management server 101 may be a Web or cloud server, or a cluster of servers, running on server hardware. Each of network access devices 102-103 is associated with a LAN such as LANs 105-106. Network 104 may be the Internet. Network access devices 102-103 may operate as a gateway device, an access point (AP), a network switch, or a combination thereof to LANs 105-106, respectively, where various client devices 108-109 can be communicatively coupled to LANs 105-106. According to one embodiment, a network access device may be a gateway device interfacing a LAN to WAN 104 and performs network address translation (NAT) for its clients, which may be network client devices 108-109 or other network access devices. A network client device may be any kind of networked computing devices, such as laptops, desktops, tablets, mobile phones, personal digital assistants (PDAs), media players, gaming devices, etc.

Referring to FIG. 1, in this example, it is assumed that network access devices 102-103 are owned by the same organization and administrated by a network administrator 107 associated with the organization. Also note that for the purpose of illustration, although network access device 103 is not shown with details therein, network access device 103 has the same or similar architecture as network access device 102. For the purpose of illustration, only two network access devices are shown, but additional network access devices may be coupled to network 104 and managed by management server 101. Also note that management server 101 may manage network access devices for multiple organizations and managed by different administrators. For example, network access device 102 may be associated with a first enterprise that is separate from a second enterprise associated with network access device 103.

According to one embodiment, management server 101 includes a management module 110 for managing network access devices 102-103. In one embodiment, each of network access devices 102-103 maintains a persistent tunnel (e.g., a secure communications channel) with management server 101 for exchanging network management messages (also referred to as an mTunnel). When a network access device such as NAD 102 boots up, NAD 102 connects and logs onto management server 101 and management server 101 authenticates NAD 102. The hardware identifier such as a serial number of NAD 102 is stored in NAD information database 111. In addition, NAD 102 may also be assigned with a network identifier for the purpose of logically grouping NAD 102 with some other NADs such as NAD 103. Thus, multiple NADs may be associated with the same network identifier. Management server 101 further includes a configuration interface 112, such as a Web interface, to allow administrator 107 to log into management server 101 to enter configuration information for configuring NADs 102-103. For example, administrator 107 may specify minimum or high level configuration parameters and management module 110 of management server 101 automatically compiles other related or low level configuration information without requiring the administrator 107 to enter such detailed configuration information, which may be time consuming and error prone.

According to one embodiment, management server 101 includes an access control policy (ACP) manager 113 to manage ACPs 114 and access control rules (ACRs) 115, which may be configured by administrator 107 via configuration interface 112. ACPs 114 and ACRs 115 are used to control access of network client devices 108-109. ACPs 114 refer to a set of predefined policies and ACRs 115 refer to a set of rules specifying how ACPs 114 should be applied. An ACR may itself be an ACP. ACPs 14 and ACRs 115 may be implemented as a single entity. According to one embodiment, ACP manager transmits ACPs 114 and ACRs 115 to each of network access devices 102-103 over the Internet and the transmitted ACPs and ACRs are stored in the network access devices 102-103, for example, as ACPs 117 and ACRs 118, and managed by an access control module (ACM) such as ACM 116.

For example, when network access device 102 boots and connects to management server 101, management server 101 authenticates network access device 102. An mTunnel is created between management server 101 and network access device 102. ACPs 114 and ACRs 115 are then downloaded from management server 101 to network access device 102 via the mTunnel and stored in network access device 102 as ACPs 117 and ACRs 118. When a client device such as client device 108 is associated with network access device 102, access control module 116 controls access of client device 108 by enforcing ACPs 117 and ACPs 118.

If there is any update concerning ACPs 117 and/or ACRs 118, access control module 116 transmits the update to management server 101. In response, management server 101 broadcasts the update to other remaining network access devices associated with the same organization, such as network access device 103. For example, when client device 108 connects with network access device 102 requesting entering LAN 105 in order to access the Internet 104, network access device 102 may examine the corresponding ACRs and/or ACPs to control the access of client device 108. In some situations, the ACRs/ACPs associated with client device 108 may indicate that the authentication of client device 108 may be performed via a remote captive portal. As a result, network access device 102 may redirect the request to the captive portal for authentication. Upon receiving a successful authentication signal, network access device 102 may update ACPs 117 and/or ACPs 118 to include information indicating that client device 108 has been successfully authenticated. Such an update is then transmitted (e.g., pushed by network access device 102 or polled by management server 101) to management server 101 and management server 101 broadcasts the update to remaining network access devices such as network access device 103. As a result, both network access devices 102-103 have the same set of ACPs and ACRs.

According to another embodiment, NADs 102-103 do not need to push ACRs up to management server 101; rather, management server 101 pushes down the ACRs to NADs 102-103. In one embodiment, a remote captive portal is implemented with the MS 101. So when a NAD device has authenticated with the captive portal, the captive portal component notifies the NAD immediately (so that the NAD can let the device online), and it simply updates the ACRs in the MS directly, at which point the ACRs are transmitted to all the other NADs.

Subsequently, referring back to FIG. 1, when client device 108 roams from network access device 102 to network access device 103, network access device 103 can use the same ACPs/ACRs to control the access of client device 108. In this example, since the updated ACRs/ACPs stored within network access device 103 include information indicating that client device 108 has been previously authenticated (e.g., via network access device 102), network access device 103 does not need to redirect the request to a remote captive portal for authentication again.

According to one embodiment, each of the ACRs 115 specifies one or more access policies or links to one or more of the ACPs 114 for a specific network client device (for example, identified by its hardware MAC address) and optionally an expiration time. As mentioned above, an access policy can include a number of parameters including bandwidth limits and traffic shaping rules, VLAN assignment, firewall rules, whether a captive portal should be applied to that device, etc. When storing an ACR, the specific rules of the policy can either be explicitly stated in the ACR, or the ACR can refer to the identifying number of a pre-defined ACP 115 that is already stored elsewhere in the system.

In one embodiment, an example ACR that explicitly specifies an ACP can be defined as follows:
    MAC address: 00:11:22:33:44:55
    Expiration: Apr. 20 2012 23:20:42
    Policy:
        Download Bandwidth: 2 Mbps
        Upload Bandwidth: 1 Mbps
        VLAN ID: 100
        Firewall: block TCP port 80

An example ACR that refers to a pre-defined policy may be defined as follows:
    MAC address: 00:11:22:33:44:55
    Expiration: (Never expires)
    Policy: policy_id 105

An ACR is associated with a version number identifying a version of the ACR. An ACR may be configured based on a network identifier of a network access device. Alternatively, an ACR may be configured based on a network identifier of one or more network access devices, rather than applying only to a specific client device. For example, a network access device may be associated with a network segment (e.g., a particular department such as finance department of a corporation) that only people with certain roles can access. Under such a circumstance, a single ACR/ACP may be utilized to control access of any client devices currently associated with that particular network access device. According to another embodiment, wireless client devices associated with different SSIDs may be assigned with different ACRs/ACPs. For example, all client devices associated with network access devices with the same network identifier may have the same default ACR/ACP applied. Within the same ACR, there may be some rules which are exceptions for different SSIDs that may override the default rules. An enterprise may have multiple network identifiers. Other configurations may also be implemented.

Referring back to FIG. 1, according to one embodiment, network access device 102 includes a device type detector 119 and device type detection methods 120. The device type detector detects device types of network client devices 108 using at least some of device type detection methods 120. Based on the detected device types, ACM module 116 selects and applies appropriate ACRs 118 and/or ACPs 117 to client devices 108. Once an appropriate ACR and/or ACP is selected and applied to a particular client device, ACM module 116 may send update information concerning the selected ACR/ACP to management server 101. In response, management server 101 in turn updates ACPs 114 and ACRs 115 locally, and broadcasts the update information received from network access device 102 to the remaining network access devices associated with the same enterprise, in this example, network access device 103. The update information may be transmitted via a corresponding mTunnel(s). As a result, each of network access devices 102-103 has the same up-to-date version of the ACRs and ACPs. The update information may include a device type of the client device, a MAC address of the client device, and the ACP/ACR selected for the client device.

According to one embodiment, when a network client device such as client device 108 connects to network access device 102 requesting accessing LAN 105 and/or WAN 104, network access device 102 may authenticate client device 108 locally or alternatively, may redirect the request to a remote authentication server 121, where authentication server 121 may be a remote authentication dial-in user service (RADIUS) server or an authentication, authorization, and accounting (AAA) server. Once client device 108 has been successfully authenticated, device type detector 119 detects the device type of client device 108 using one or more of device type detection methods 120. Note that it can also happen that device type detection and subsequent automatic policy assignment can happen before authentication of a client device, rather than afterwards. One of the advantages here is that depending on the configured policies, it might not be necessary for the client device to authenticate at all (for example, if the administrator has configured the system to "whitelist" any Apple iPad, then all such devices are automatically allowed onto the network without any intervention by the end user). Based on the detected device type, ACM module 116 is to select an appropriate ACR and/or ACP from ACRs 118 and/or ACPs 117 for the client device. In addition, ACM module 116 may further customize the ACR/ACP selected for client device 108, including information indicating whether client device 108 has already been successfully authenticated. Thereafter, network access device 102 sends update information to management server 101. The update information includes at least the MAC of client device 108, the device type of client 108, and the selected ACR/ACP for client device 108 or information identifying the selected ACR/ACP including data indicating whether client device 108 has already been successfully authenticated. Alternatively, the device type does not need to be transmitted to the MS by the NAD, all that would strictly be needed is the MAC address and the selected ACR/ACP, which is what MS needs to broadcast to the other NADs. In a particular embodiment, the device type detection largely happens in the MS and/or captive portal server, instead of the NAD; the NAD provides basic info (e.g., user agent string, MAC address, and DHCP fingerprint info) to the cloud-based server, which then actually makes the determination of which policy to apply and updates ACRs/ACPs on the MS.

In response to the update information received from network access device 102, management server 101 is to broadcast the update information to the remaining network access devices such as network access device 103. In one embodiment, management server 101 may only transmit to a network access device the delta difference between the updated ACR/ACP compared with the corresponding existing ACR/ACP stored in the network access device, for example, based on version information of the corresponding ACR/ACP.

Subsequently, when client device 108 roams from network access device 102 to network access device 103, network access device 103 can enforce the same ACR/ACP against client device 108. In addition, since the updated ACR/ACP includes information indicating that client device 108 has been previously authenticated, when client device 108 connects to network access device 103, network access device 103 can simply enforce the ACR/ACP without having to authenticate or redirect client device 108 to authentication server 121 for authentication again. Furthermore, network access device 103 does not have to detect the device type of client device 108 again, since the ACR/ACP for client device 108 have been established previously by network access device 102.

The device type of a network client device can be detected using several detection methods 120 dependent upon the circumstances. In one embodiment, a device type of a client device can be determined based on its MAC address, also referred to as a layer-2 detection method. The first three bytes of an NCD's hardware MAC address is known as the organization unique identifier (OUI), and the value is registered to a specific hardware manufacturer in a public database. By performing a lookup in this database, it is possible to determine the manufacturer of the device, which can help with identifying the type of device. For example, when a network client device is manufactured, the network client device is assigned with a unique MAC address that is associated with the manufacturer. A prefix portion of the MAC may be uniquely associated with a particular manufacturer. For example, a MAC prefix of "00.18.0a" is associated with Meraki, Inc. Thus, based on the prefix portion of the MAC, the manufacturer can be ascertained. Based on the identified manufacturer, together with some other identifying information, the device type can be determined.

According to another embodiment, the device type of a network client device can be determined based on a combination of one or more DHCP options in one or more DHCP messages when the network client device connects to a network access device and attempts to obtain DHCP information such as an IP address. Such a device type detection method is referred to herein as a DHCP fingerprint detection method. DHCP fingerprinting is the identification of operating system (OS) on a NCD based on which options the NCD includes in the DHCP request messages sent when the NCD first connects to the network. Different OSes tend to use different sets of options with different values, so this method can often identify which OS is being used. In one embodiment, based on a combination of options specified in the DHCP messages, such as DHCP discover and DHCP request messages, the network access device can determine the device type. For example, an Apple client device running an iOS operating system therein may use DHCP options of "1, 3, 5, 7, 12, 13, and 18." Thus, based on these DHCP options, the network access device may determine that such a client device is likely a device from Apple having the iOS running therein.

The DHCP is a network configuration protocol for hosts on IP networks. Computers that are connected to IP networks must be configured before they can communicate with other hosts. The most essential information needed is an IP address, and a default route and routing prefix. DHCP eliminates the manual task by a network administrator. It also provides a central database of devices that are connected to the network and eliminates duplicate resource assignments. In addition to IP addresses, DHCP also provides other configuration information, particularly the IP addresses of local Domain Name Server (DNS), network boot servers, or other service hosts. A list of DHCP options can be found in RFC-2132, which is incorporated by reference herein in its entirety.

According to a further embodiment, the device type of a client device may be detected based on one or more user agent string patterns obtained from one or more messages initiated from an application, such as a browser application, of the client device. By inspecting details of some higher-level protocols in packets sent by the NCD it is often possible to gain additional clues about the type of the device. For example, HTTP fetches often include as part of the HTTP header a "user agent string", which may include an identifier specifying either the type of the device and/or the OS that the device is running.

According to one embodiment, when a user of a client device launches a browser application to access the Internet, the browser application may send out some user agent strings including information identifying an operating system running within the client device and/or a name or model of the client device. For example, a browser application of a client device having a MAC OS running therein may send out a user agent string of "Mozilla*OS X*." Based on such a user agent string, the network access device can determine that the client device has a MAC OS running therein and the client device is associated with Apple Inc. In other situations, the user agent string may further include "iPad" and the network access device can determine that the client device is an iPad from Apple Inc. This device type detection method is referred to as an application layer or layer-7 detection method. In this situation, according to one embodiment, the device type detection may not be performed until a user of a client device launches a browser application attempting to access the Internet.

Figure 2:
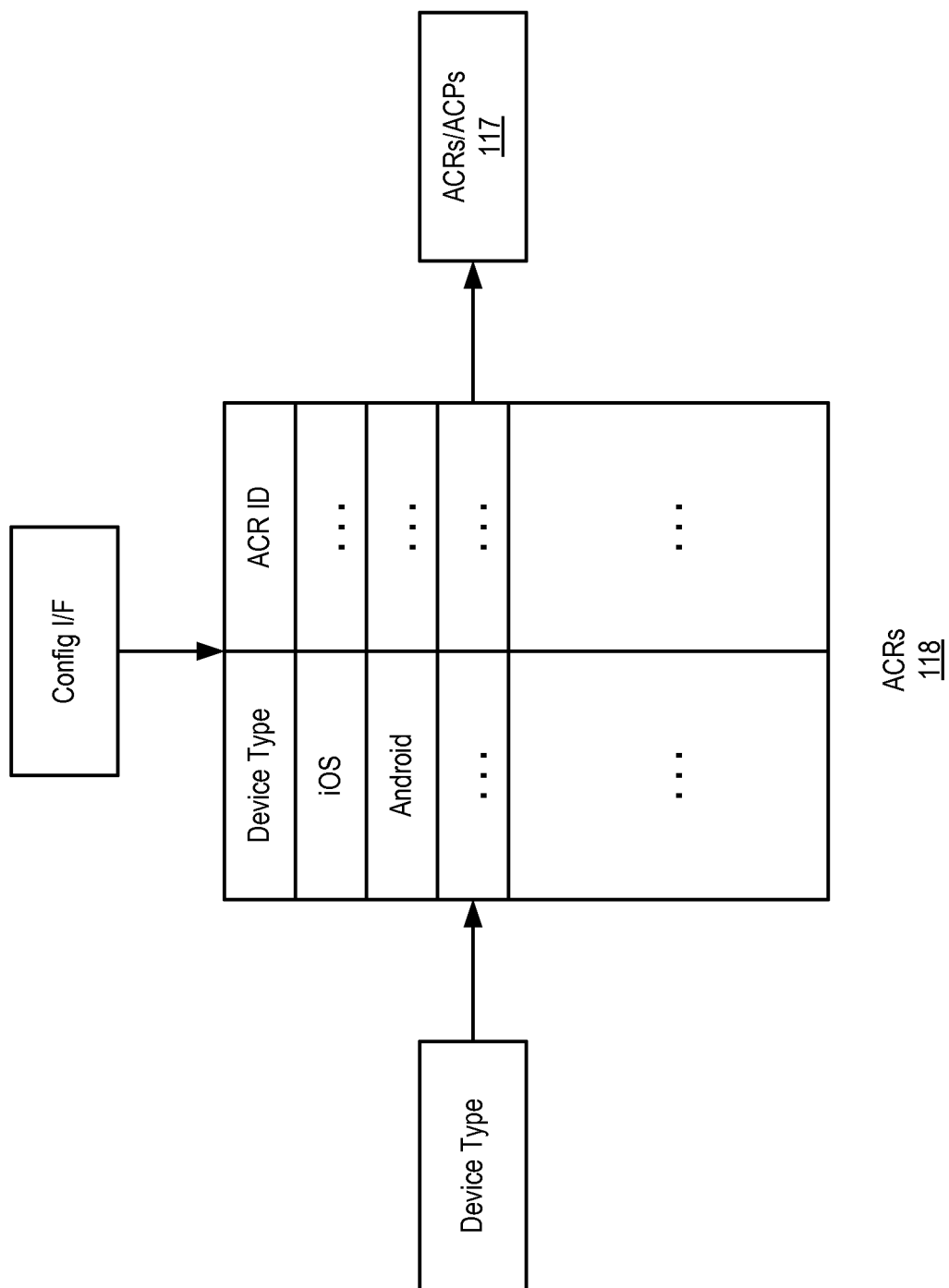
FIG. 2 is a block diagram illustrating a mechanism to determine access control rules or policies based on the device type of a client device according to one embodiment of the invention.
Figure 3:
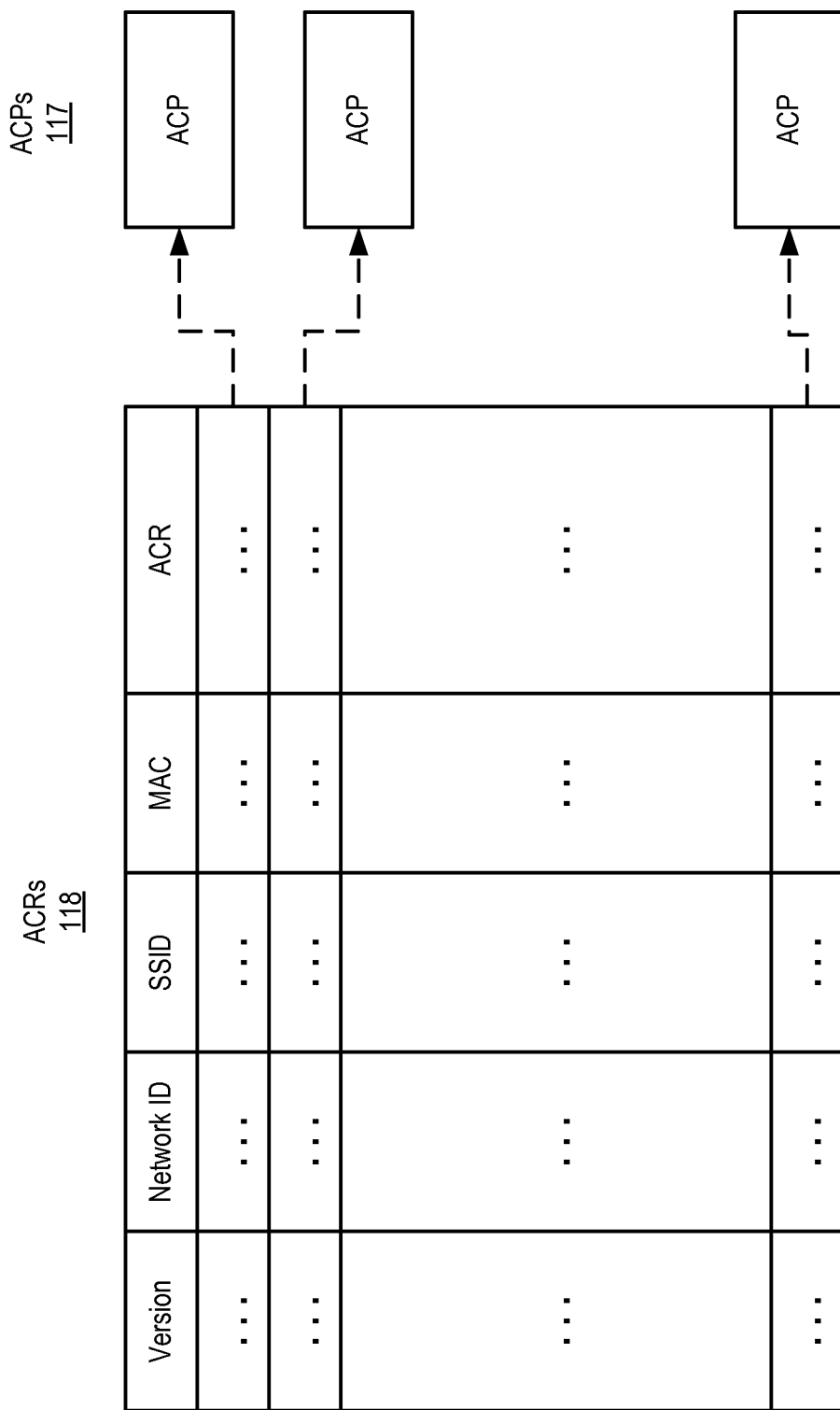
FIG. 3 is a block diagram illustrating a data structure representing access control rules and policies according one embodiment of the invention.

Once the device type of the client device has been determined, as shown in FIG. 2, an ACR/ACP can be identified and selected, and enforced against the client device. Thereafter, the ACR/ACP selection update can then be transmitted from the network access device to the management server. The management server in turn populates the update locally and distributes the update to the remaining network access devices associated with the same enterprise. FIG. 3 is a block diagram illustrating an example of ACRs 118 and ACPs 117, which may be downloaded from ACRs 115 and ACPs 114 of management server 101 over the Internet. Note that the ACRs and ACPs may be maintained within a single data structure. Some of the ACRs may include the entire ACP therein or alternatively a reference to a separate predefined ACP as described above.

According to one embodiment, a combination of two or more of the layer-2, layer 7, and DHCP fingerprint detection methods may be utilized to determine the device type of a client device. The term of "device type" refers to the combination of manufacturer, model, and/or operating system that is running on the client device. Examples of "device type" could include categories like "Apple iPhone", "Android smart phone", "BlackBerry", or "PC running Windows 7". The above three types of data can be combined to identify the type of an NCD that is connecting. The exact heuristics vary for different device types, but often it is necessary to combine multiple data sources to accurately identify the type of an NCD. For example, all Apple iOS devices (iPads, iPhones, iPods) use the same DHCP fingerprint, so this is not sufficient for determining whether a device is an iPhone or an iPad. However, by combining the DHCP fingerprint with a user agent string from an HTTP request, it is generally possible to determine the device type reliably.

In addition to the above detection methods, one could optionally use other information from network traffic to determine device type, including Default IP/TCP options (TTL, presence of timestamp option in TCP)

Presence of autodiscovery traffic such as multicast DNS queries and services offered Active probing of devices to determine what services they are offering (netbios/samba, rdp)

Looking for specific HTTP fetches (many Apple products always do a CaptiveNetworkSupport query, some antivirus vendors try and update their virus definition files)

Based on the type of a device and the configuration specified by the network administrator, the system may then apply an appropriate ACP. Once the ACP has been applied, the NADs in the system are to enforce the specified ACP.

Referring back to FIG. 1, according to one embodiment, configuration interface 112 may be implemented as a Web interface to allow administrator 107 to configure ACPs 114 and ACRs 115 at a higher granularity level. When using configuration interface 112, administrator 107 can simply select the type of device (e.g. "Android smart phone" or "Apple iPhone") from a drop-down list in a graphical user interface (GUI), and then select which pre-defined access control policy they want to apply to that type of device. An example of such a GUI is shown in FIG. 4A according to one embodiment.

Figure 4A:
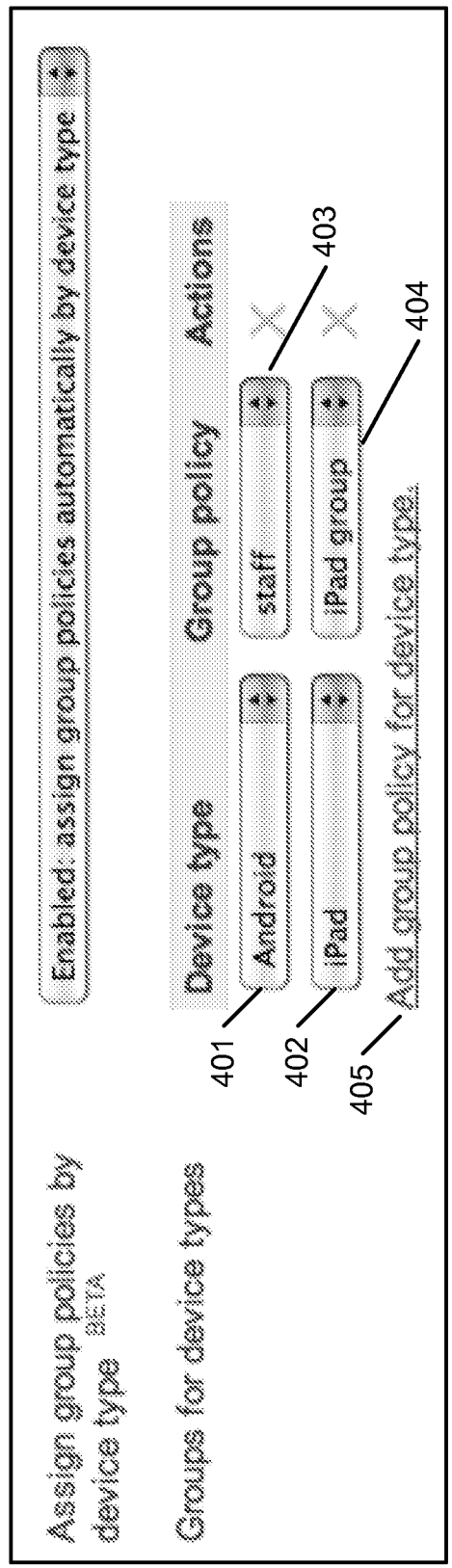
FIGS. 4A and 4B are examples of a graphical user interface for configuring access control rules and policies according to certain embodiments of the invention.
Figure 4B:
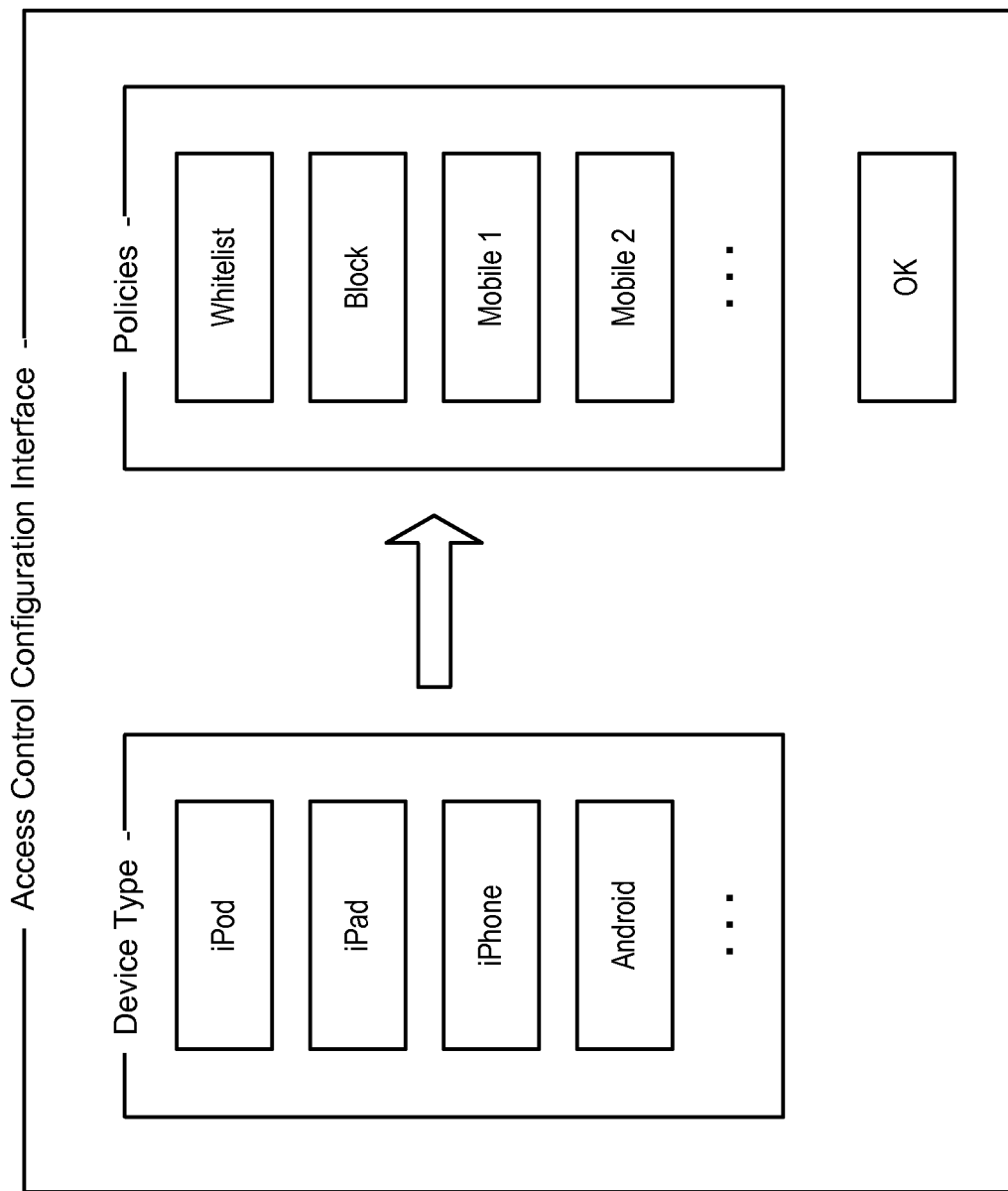

Referring to FIG. 4A, GUI 400 includes fields 401 and 402 to allow an administrator to specify a device type at a higher granularity level and associate respective predefined ACPs 403-404 for the device types. For example, the administrator can specify an ACP for devices associated with a particular operating systems (e.g., Android) or associated with a category of devices (e.g., iPad), without having to specify at a lower or more detailed level such as a MAC address level. The administrator can further add more ACPs for different device types via link 405. Alternatively, the user interface can be implemented as lists of buttons as shown in FIG. 4B. One list corresponds to a variety of different device types and the other list corresponds to a list of predefined access control policies. A user can click on one of the device type buttons and click on one of the policy buttons to assign a policy to a device of a particular type.

The system then automates the identification of NCDs by device type as well as the assignment of an ACP based on that type. In one embodiment, the system assumes that there is already a provision in the system for defining ACPs and allowing an administrator to assign those ACPs manually to either specific NCDs (for example, to specify that device with MAC address 00:00:01:02:03:04 should have the "finance group" ACP applied to it) or to specific login users (e.g. when using a user-based device authentication system, the administrator might specify that all devices authenticated by a particular user should always have the "finance group" ACP applied.)

According to one embodiment, the device type detection operations may be performed at a remote server such as device type detection server 122, which may include the functionality of a device type detector 119 and device type detection methods 120. In one embodiment, after successfully authenticating a client device such as client device 108, either locally within a network access device or remotely by authentication server 121, network access device 102 redirects the traffic to device type detection server 122 for detecting the device type of the client device. Device type detection server 122 may user a combination of the detection methods as described above to detect the device type of the client device and transmit the device type information back to network access device 102. Based on the device type information received from device type detection server 122, network access device 102 identifies and selects or generates an appropriate ACR/ACP from ACRs 118 and/or ACPs 117, and enforces the selected ACR/ACP against client device 108. According to one embodiment, the detection might actually be done before client device authentication. Also, if a remote server is performing the device type detection, some of the data that such a remote server might wish to use (e.g. the DHCP fingerprint and OUI data) would need to be transmitted from the NAD to the remote server, which would not be able to access that information otherwise. This information could be communicated from the NAD to the remote server via an mTunnel, for example.

According to another embodiment, once the device type detection server 122 detects the device type of client device 108, device type detection server 122 sends the device type information to management server 101. In response, management server 101 identifies, selects, or generates an appropriate ACR/ACP for client device 108 and sends the ACR/ACP of the client device 108 back down to network access device 102. Management server 101 may further broadcast the ACR/ACP for client device 108 to other network access devices, such as network access device 103, associated with the same enterprise.

If the device authentication is performed by a remote server such as server 121, there may be two redirections: 1) between network access device 102 and authentication server 121; and 2) between network access device 102 and device type detection server 122. Alternatively, once the authentication is completed by authentication system 121, the authentication server 121 redirects the traffic to device type detection server 122, without going back to network access device 102. Note that authentication server 121 and device type detection server 122 may be implemented as a single server, and alternatively, one or both of them may be implemented as part of management server 101. The redirections may be performed in the background without the knowledge of client device 108.

Referring back to FIG. 1, according to one embodiment, management server 101 maintains a data structure, such as, for example, an ACR log (not shown), to keep track of updates or changes of ACRs 114 and/or ACPs 115. The ACRs are stored centrally as a time-ordered log of additions and deletions of individual ACRs. Each ACR log entry includes a numerical version that increases over time. A convenient implementation of the version is to use a timestamp when that log entry was added, however any numerical value that is strictly increasing over time will suffice. An example of an ACR log is shown in FIG. 5. Referring to FIG. 5, device 00:00:01:02:03:05 is assigned to policy_id 105, and 00:00:01:02:03:06 is assigned to policy_id 110; device 00:00:01:02:03:04 had a policy added and then removed, so its policy is no longer active.

Management server 101 keeps NADs 102-103 up-to-date by periodically sending any ACRs that have been recorded in the log since the last update they received. In one embodiment, NADs 102-103 periodically query management server 101, sending the version of the log entry that they last received. Management server 101 replies by sending any ACR entries from the log that were inserted after the version the NAD reports having. In another embodiment, management server 101 periodically queries each of the NADs 102-103. The NAD replies with the version number of the last log entry it received, and management server 101 then replies with any additional new entries that it has recorded.

If a new NAD is added to the system, it will initially report a version of zero since it has no ACRs yet, and management server 101 will need to reply with all of the current ACRs. In order to keep this lookup efficient and in order to keep the log from growing without bound, according to one embodiment, a software process runs periodically on management server 101 and re-inserts or copies any old (based on a configurable time period) unexpired ACR entries into the front of the log, and then deletes all old entries. This house-keeping (i.e., garbage collection) process ensures that the full set of all active ACRs is contained in the recent portion of the log, and that the size of the log does not grow without bound.

Note that a variety of garbage collection methods can be utilized herein for such purposes, such as, for example, a mark-and-sweep method. A mark-and-sweep garbage collector maintains a bit (or two) with each object (e.g., an ACR entry) to record whether it is white or black (e.g., invalid or valid, where a deleted ACR is an invalid entry); the grey set is either maintained as a separate list (such as the process stack) or using another bit. As the reference tree is traversed during a collection cycle (the "mark" phase), these bits are manipulated by the collector to reflect the current state. A final "sweep" of the memory areas then frees white objects (e.g., invalid entries), for example, by moving or copying the valid entries with old timestamps (e.g., old versions) to the top of the queue or buffer, with new timestamps.

According to another embodiment, the entire log is played forward once to build the final ACR state as of the current time. To accomplish that, ACR entries are added or removed based on the records in the log, and any ACR whose expiration date is now in the past is skipped entirely. This provides a set of ACR entries that are still valid (have neither expired nor been explicitly deleted/removed), referred to as the Current Valid Rules (CVR). The oldest portion of the log (e.g. the oldest one day's worth of entries, or however much one wants to clean) is played forward again. Any ACR entry that is in the CVR set is re-inserted at the front of the log. The oldest portion of the log (whichever portion reinserted) can now be discarded. This has the effect of implicitly deleting any entries at the back of the log that were no longer valid; we did not re-insert them, and then we deleted all entries. Note that it is not necessary to communicate any of this to the NADs, because they already have all the relevant information: ACRs that have expired will already be dropped by the NADs, and ACRs that were explicitly deleted will already be deleted on the NADs too. This just prevents us from broadcasting stale ACRs to new NADs that join the network, and keeps the size of the log manageable.

Such a garbage collection process may be performed by the management server and the management server broadcasts the updated ACRs to the network access devices with a newer version. Alternatively, such a garbage process may be performed by the network access devices, in which each of the network access devices maintains an ACR log. For example, the management server may send a command, via a respective persistent mTunnel using a variety of tunneling protocols (e.g., UDP/IP or UDP/HTTP), to network access devices indicating which of the entries are not invalid (e.g., deleted) to allow the network access devices to remove the invalid entry or entries from its ACR log.

According to some embodiments, ACRs that apply to multiple NCDs can be implemented by allowing wildcards or ranges of values in the MAC address field (e.g., a prefix portion of the MAC) of the ACRs. Multiple layers of policies are possible by including a "priority" for each ACR entry (e.g., a specific rule or exception overriding a default or base rule). This would allow an administrator to specify a default policy for all devices, for example, and to override that default policy (e.g., policy associated with a particular network identifier) with a different policy for specific devices (e.g., specific policies for different SSIDs), by allowing the highest priority policy to take precedence. In a system where multiple logical networks are hosted on the same management server, a single ACR log can be used for the whole system by adding appropriate identifier fields to the log.

For example, a management server might handle functionality for multiple separate networks with separate rules, in which case a network identifier field could be added to the ACR log format. Similarly, a wireless network might have different SSIDs which act as different virtual networks with separate access control policies, in which case an SSID identifier field could be added. To improve transmission efficiency of sending ACRs to devices, a compact or compressed binary format such as Google Protocol Buffers or Apache Thrift can be used to send the updates. To increase overall system efficiency, NADs can periodically store the current ACR state to local persistent storage. This will make it so that if their runtime state is lost (e.g. if the device loses power and reboots), they will not need to re-fetch the entire list of ACRs from the central server. Instead, they can recover the last known ACR state from its local storage after reboot, particularly, if the last known ACRs were updated within a predetermined period of time (e.g., still fresh or valid).

Figure 6:
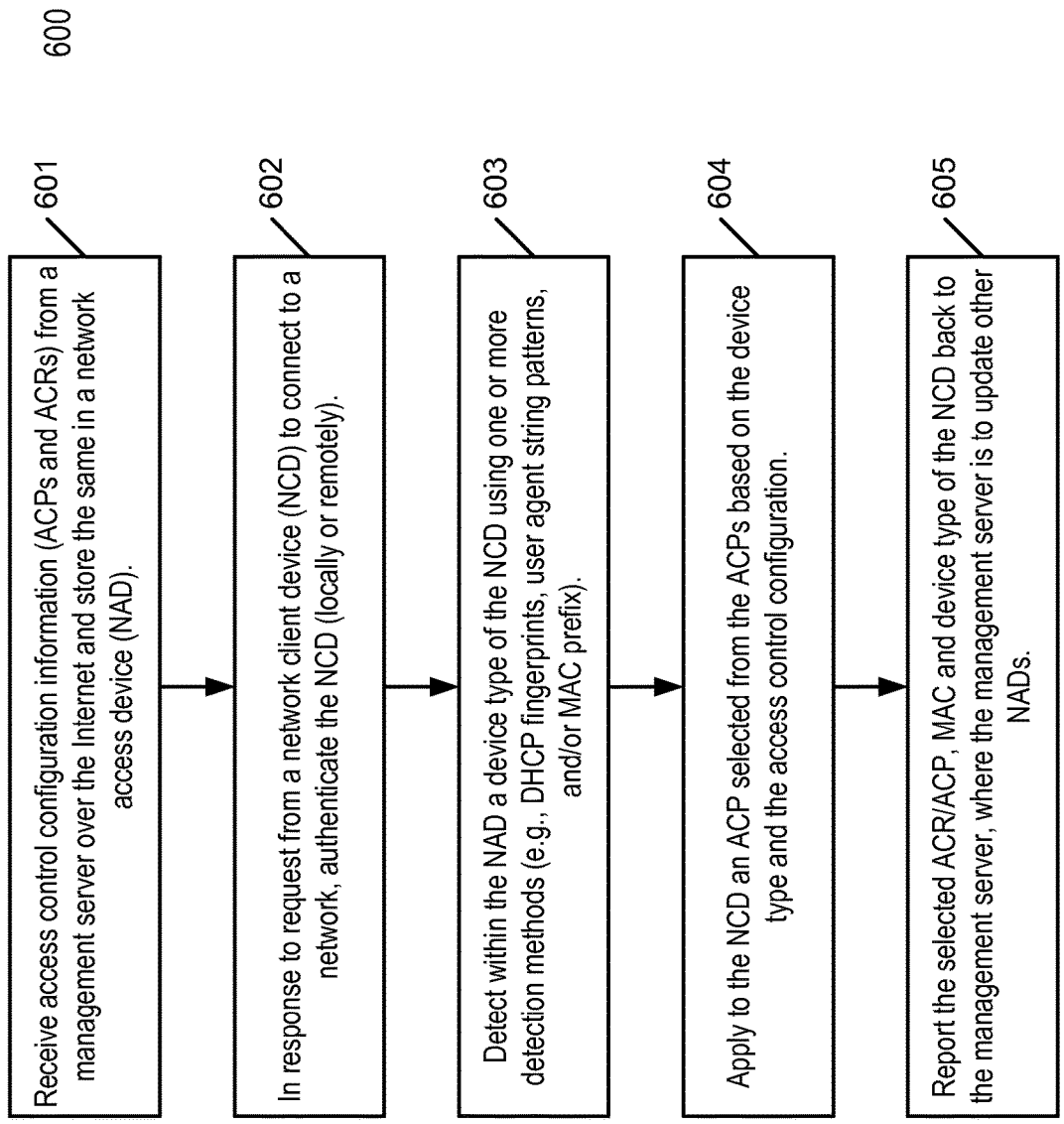
FIG. 6 is a flow diagram illustrating a method for managing access control rules and policies according to one embodiment of the invention.

FIG. 6 is a flow diagram illustrating a method for managing access control rules and policies according to one embodiment of the invention. Method 600 may be performed by processing logic which may include software, hardware, or a combination thereof. For example, method 600 may be performed by any of the network access devices of FIG. 1. Referring to FIG. 6, at block 601, processing logic receives access control configuration information (e.g., ACPs and ACRs) from a management server over the Internet and stores the same in a local storage of a network access device. At block 602, in response to a request from a network client device to connect to a network, the network client device is authenticated, either locally or remotely. At block 603, the device type of the client device is detected by the network access device using one or more device type detection methods (e.g., DHCP fingerprinting, user agent string patterns, and/or MAC address prefix). At block 604, apply to the client device an ACP/ACR selected or generated based on the device type and the access control configuration information. At block 605, the ACR/ACP for the client device, MAC address, and the device type of the client device are reported back to the management server over the Internet, where the management server is to update other network access devices.

Figure 7:
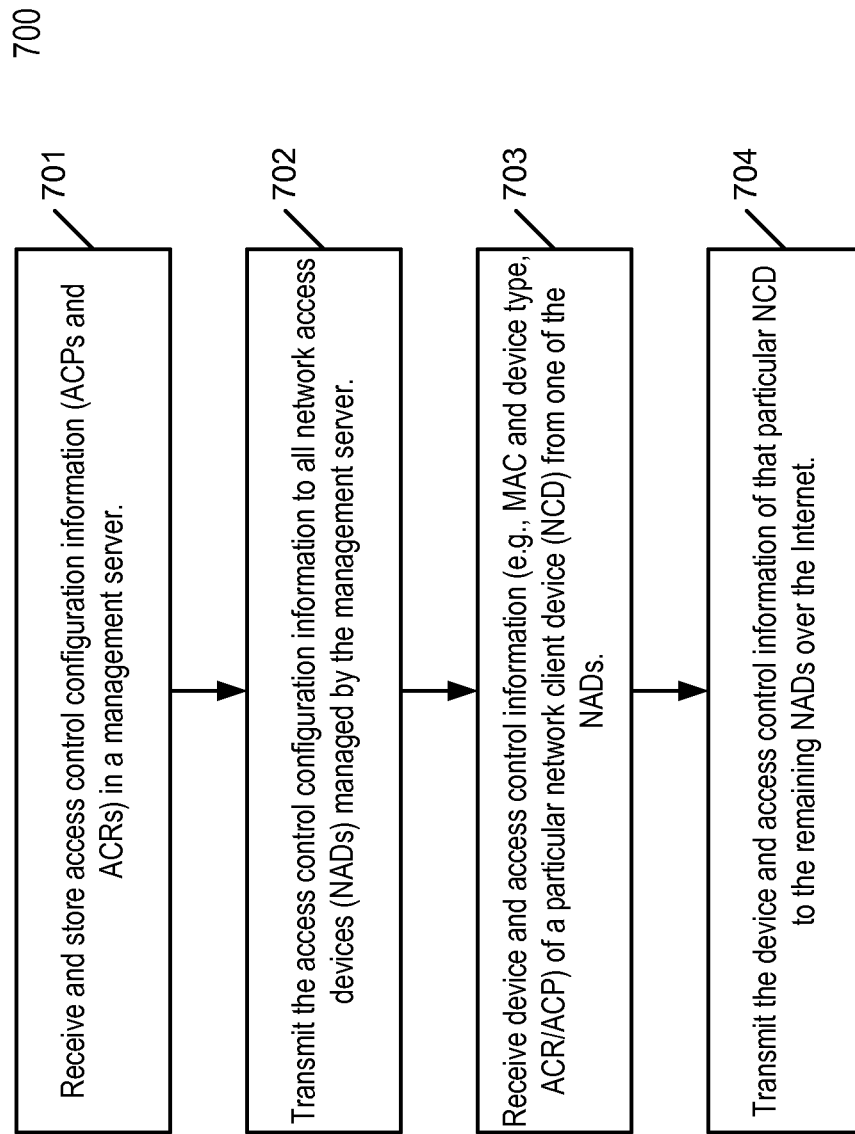
FIG. 7 is a flow diagram illustrating a method for managing access control rules and policies according to another embodiment of the invention.

FIG. 7 is a flow diagram illustrating a method for managing access control rules and policies according to another embodiment of the invention. Method 700 may be performed by processing logic which may include software, hardware, or a combination thereof. For example, method 700 may be performed by management server 101 of FIG. 1. Referring to FIG. 7, at block 701, processing logic receives access control configuration information from a Web interface and stores the same in the management server. At block 702, the ACRs/ACPs are transmitted from the management server to network access devices that are managed by the management server, where the network access devices may be associated with the same enterprise. At block 703, processing logic receives device and access control information (e.g., MAC address and device type, and the ACR/ACP information) of a particular network client device from one of the network access devices. At block 704, the device and access control information of that particular network client device is then transmitted from the management server to the remaining network access devices over the Internet.

Figure 8:
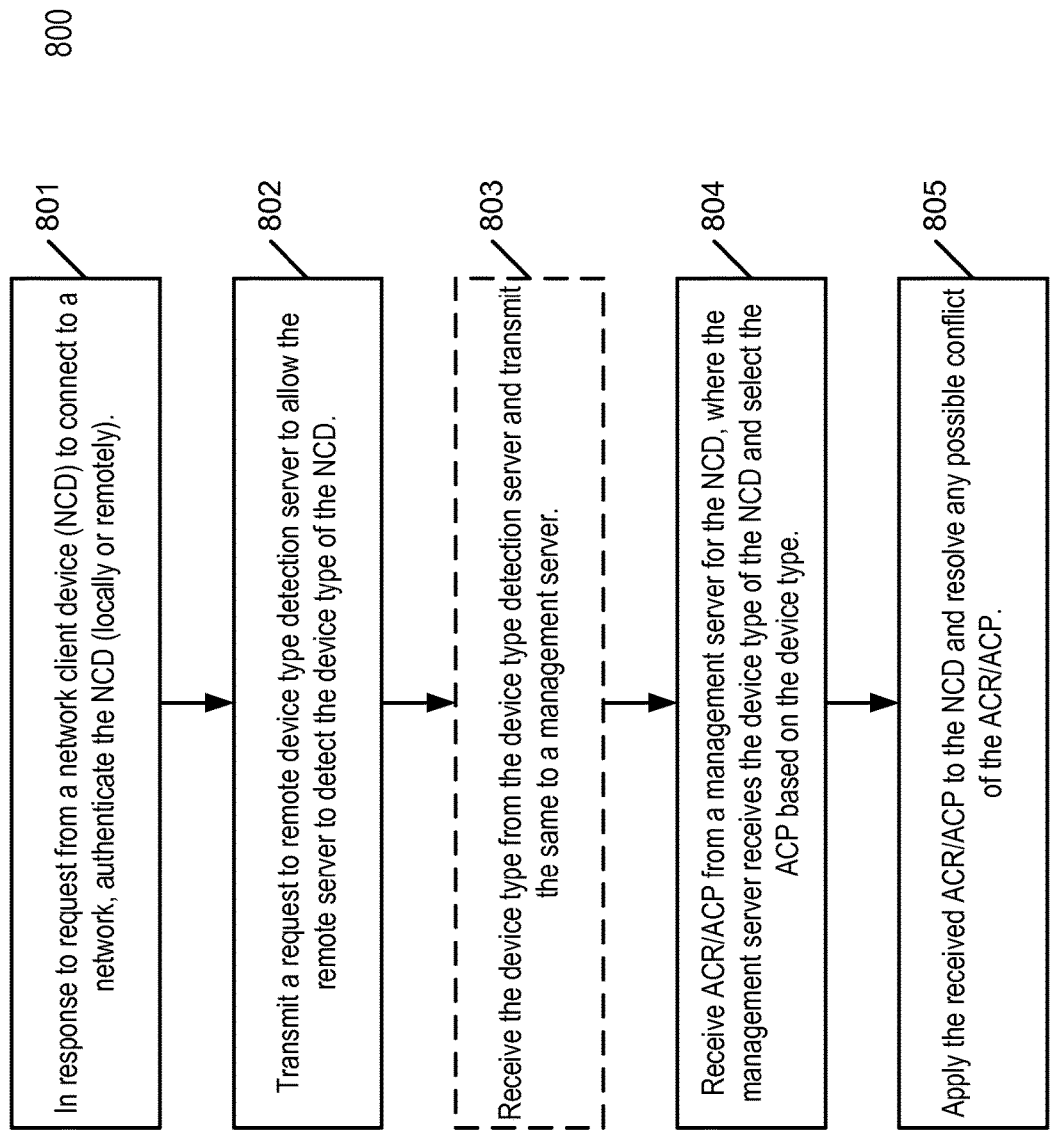
FIG. 8 is a flow diagram illustrating a method for managing access control rules and policies according to another embodiment of the invention.

FIG. 8 is a flow diagram illustrating a method for managing access control rules and policies according to another embodiment of the invention. Method 800 may be performed by processing logic which may include software, hardware, or a combination thereof. For example, method 800 may be performed by any of the network access devices of FIG. 1. Referring to FIG. 8, at block 801, in response to a request from a network client device for connecting to a network (e.g., LAN or WAN), the client device is authenticated, either locally by the network access device or remotely by a remote authentication server. At block 802, a request is transmitted to a remote device type detection server to allow the remote server to detect the device type of the network client device. At block 803, the processing logic receives the device type from the remote device type detection server and transmits the same to a management server. As described above, this operation may be optional. In one embodiment, after detecting the device type, the remote device type detection server is to redirect the traffic to the management server without sending the device type information back to the network access device. In this situation, the management server receives the device type information from the device type detection server and determines the ACR/ACP for the client device. At block 804, an ACR/ACP for the client device is received from the management server, where the management server is to select or generate the ACR/ACP for the client device based on the device type information received from the network access device. At block 805, the ACR/ACP is applied to the client device at the network access device.

Figure 9:
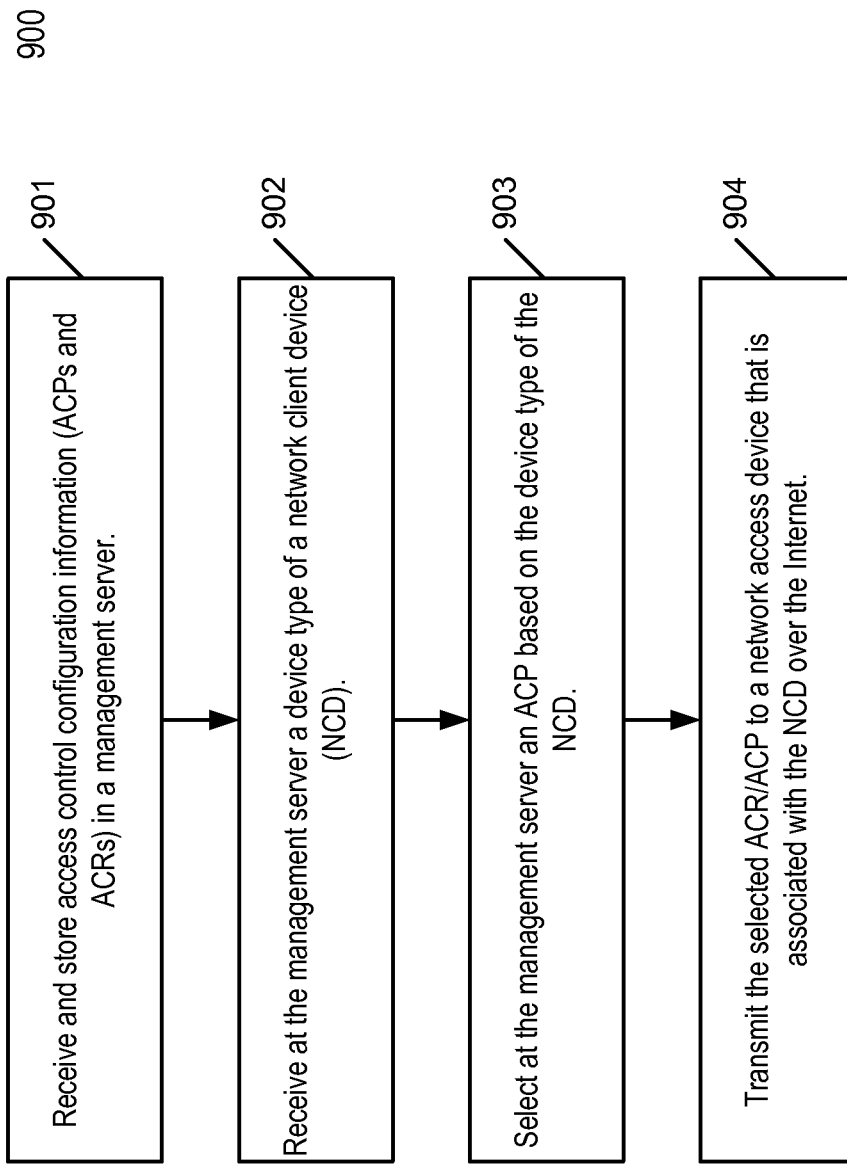
FIG. 9 is a flow diagram illustrating a method for managing access control rules and policies according to another embodiment of the invention.

FIG. 9 is a flow diagram illustrating a method for managing access control rules and policies according to another embodiment of the invention. Method 900 may be performed by processing logic which may include software, hardware, or a combination thereof. For example, method 900 may be performed by management server 101 of FIG. 1. Referring to FIG. 9, at block 901, access control configuration information is received via a Web interface from an administrator and stored within the management server. At block 902, a device type of a network client device is received at the management server. The device type may be detected and received from a network access device associated with the client device. Alternatively, the device type may be detected and received from a remote dedicated device type detection server. At block 903, an ACP/ACR is selected or generated within the management server based on the device type of the network client device. At block 9045, the ACR/ACP is then transmitted to the network access device associated with the client device, as well as other remaining network access devices.

Figure 10A:
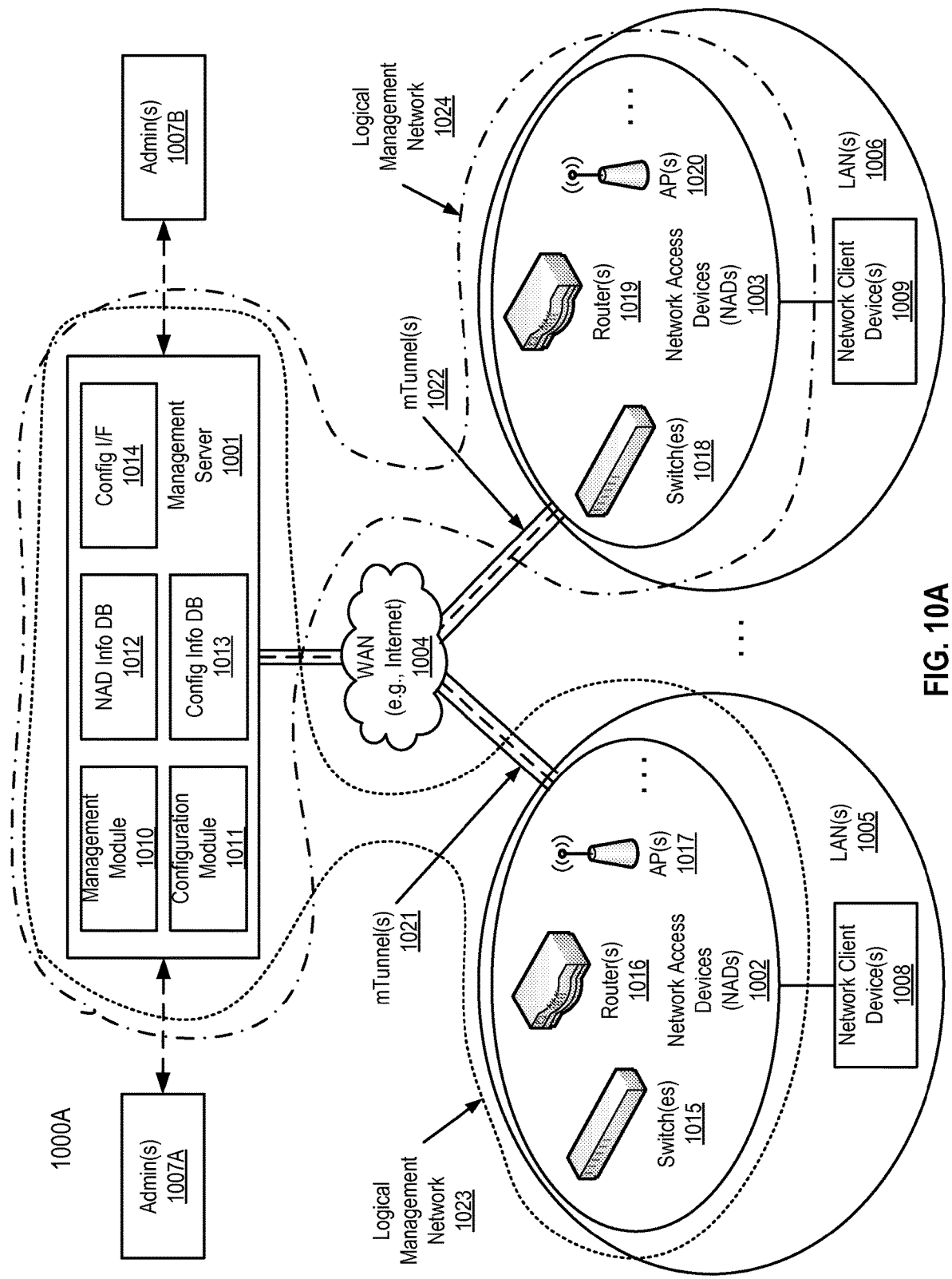
FIGS. 10A and 10B are block diagrams illustrating a cloud managed network configuration according to certain embodiments of the invention.

FIG. 10A is a block diagram illustrating a cloud managed network system according to one embodiment of the invention. System 1000A may be implemented as part of any of the network systems described above, such as system 100 of FIG. 1. Referring to FIG. 10A, system 1000A includes, but is not limited to, various network access devices (NADs) 1002-1003 managed by a management server 1001 over WAN 1004. Management server 1001 may be a Web or cloud server, or a cluster of servers, running on server hardware. Each of network access devices 1002-1003 may be associated with a LAN such as LANs 1005-1006. A LAN herein may also refer to a sub-network or network segment (e.g., subnet or a virtual LAN (VLAN)) of a larger LAN (e.g., Intranet). Network 1004 may be the Internet. Any of network access devices 1002-1003 may operate as a gateway device (e.g., routers 1016 and 1019), an access point (AP) (e.g., APs 1017 and 1020), a network switch (e.g., switches 1015 and 1018), or a combination thereof to LANs 105-106, wired or wireless, where various network client devices (NCDs) 1008-1009 can be communicatively coupled to LANs 105-106.

According to one embodiment, a network access device may represent a gateway device interfacing a LAN to WAN 1004 and performs network address translation (NAT) for its clients, which may be client devices 1008-1009 or other network access devices. A network access device may be configured behind another network access device. For example, an uplink of an access point may be coupled to a downlink of a gateway device. Alternatively, an uplink of a network switch may be coupled to a downlink of a gateway device or an access point, etc. A network access device may be an integrated device integrating two or more of these functionalities (e.g., router/gateway, access point, and/or network switch), wired and/or wireless.

Referring back to FIG. 10A, in one embodiment, management server 1001 works for both single and multi-tenant installations, meaning that multiple organizations with different network administrators may have network access devices managed by the same management server, and network configuration or management can be performed using the same management server, but are firewalled off from each other and do not have access to each other's network configurations. In this example, network access devices 1002 and network access devices 1003 may be associated with or owned by the different organizations and administrated by different network administrators 1007A and 1007B associated with the organizations. Some of network access devices 1002 may communicate with each other to form a local mesh network, while some of network access devices 1003 may communicate with each other to form another local mesh network.

According to one embodiment, management server 1001 includes a management module 1010 and a configuration module 1011 to manage and to configure network access devices 1002-1003 and to generate management server configuration information for each of network access devices 1002-1003, which may be stored in configuration information database 1013. In one embodiment, management server 1001 provides a user interface 1014 such as a Web interface to allow a network administrator such as administrators 1007A and 1007B to create and log into an account associated with an organization to which the network access devices 1002 or network access devices 1003 belong.

The management server 1001 further includes a NAD information database 1012, including information regarding the network access devices 1002-1003. In one embodiment, the NAD information database 1012 includes a serial number and a mechanism to authenticate the network access device's identity (e.g., the public key of a private public key pair, the private key of which was embedded or stored in the network access device during the manufacturing). NAD information database 1012 may be populated different ways in different embodiments (e.g., populated by the seller of the network access devices, populated by the network administrator). In embodiments in which this information is populated by the seller, different embodiments may associate the information regarding network access devices 1002-1003 in the router information database with the user account in different ways (example, network administrators 1007A and 1007B may provide an order number (or invoice number) associated with a purchase of network access devices 1002 or 1003).

According to one embodiment, when a network access device is powered up and attempts entering network 1004, the network access device attempts to contact management server 1001. In one embodiment, certain device information such as an IP address and domain name service (DNS) name of management server 1001 is stored in the network access device when it is manufactured. In one embodiment, when the network access device is powered up, the network access device performs any self configuration processes including obtaining an IP address for itself from a dynamic host configuration protocol (DHCP) facility (which address may be a public IP address, or may be a private IP address if there is a device performing NAT between the router and the WAN (that is to say, the network access device is behind a device performing NAT)). The network access device then accesses management server 1001 based on the server's IP address and authenticates itself (e.g., signing a message (e.g., including the serial number of the network access device) using a private key associated (and/or stored) with the network access device, such that management server 1001 can authenticate the network access device using the associated public key (stored in NAD information database 1012) maintained by management server 1001).

In one embodiment, each of network access devices 102-103 creates one or more secure communication channels (e.g., a control tunnel) with server 1001 using the keys downloaded from management server 101 to exchange control traffic such as management messages or notification, operating status of the network access device, etc. Such a tunnel for network management purposes is referred to herein as an mTunnel. In this example, network access devices 1002 maintain at least one mTunnel 1021 with management server 1001 and network access devices 1003 maintain at least one mTunnel 1022 with management server 1001. In one embodiment, each of network access devices 1002 may maintain a persistent mTunnel with management server 1001. Alternatively, only the network access device operating as a gateway device maintains an mTunnel with management server 1001, while other network access devices behind the gateway device communicate with the gateway device to share the same mTunnel. Typically, a network access device operating as a gateway performs network address translation (NAT) for its clients, which may be a network client device or another network access device.

In one embodiment, once a network access device has been successfully authenticated by server 1001, the network access device downloads configuration information and stores it in a storage device within the network access device. This download may take place over a secure session layer (SSL)-encrypted session and/or the management server may encrypt the data using the public key corresponding to the private key. This secure channel may also be used to receive subsequent configuration updates from management server 1001. According to one embodiment, subsequently, when there is a change in the configuration, such as adding or removing a network access device, changing of subnet settings (for example, by an administrator such as administrators 1007A and 1007B via a Web interface of management server 1001), management server 1001 generates updated configuration information and communicates the updates to the network access devices via their corresponding mTunnels (such communication can be done with different mechanisms depending on the embodiment of type of information, including a push mechanism, a pull mechanism, etc.).

A variety of tunneling protocols can be utilized over an mTunnel between a network access device and management server 1001, such as, for example, Internet protocol (IP) over user datagram protocol (UDP) (IP/UDP) encapsulation. For example, a network management message may be carried as an IP packet and the IP packet may be encapsulated within a UDP packet exchanged between a network access device and management server 1001 over a respective mTunnel. In one embodiment, an IP packet having one or more network management messages embedded therein may be wrapped with a predetermined mTunnel header and is transmitted within a UDP packet between management server 1001 and a network access device, even if the network access device is behind a NAT device.

In some configurations, if a network access device is behind a firewall that does not allow any UDP packet going through, a UDP packet carrying a network management message may be encapsulated within a hypertext transport protocol (HTTP), referred to herein as UDP over HTTP (UDP/HTTP). Since most of the firewalls allow Internet traffic using HTTP protocol with a transport control protocol (TCP) port of 80, it is likely a UDP packet embedded within an HTTP packet having a destination TCP port of 80 can reach management server 1001. In such a configuration, when management server 1001 receives the HTTP packet, it may remove any HTTP header to reveal a UDP packet encapsulated therein. Thereafter, an IP packet encapsulated within the UDP packet may be extracted and the network management message within the IP packet can be obtained.

According to one embodiment, management server 1001 and network access devices associated with an organization such as network access devices 1002 may utilize a private or internal set of IP addresses to exchange network management messages via the respective mTunnel or mTunnels. That is, the private IP addresses used by management server 1001 and network access devices 1002 via the respective mTunnel or mTunnels may be in a separate IP address space (e.g., 6.x.x.x) that is different from an IP address space used between network access devices 1002 and their network client devices 1008 over LAN(s) 1005 (e.g., 10.x.x.x). That is, the private IP addresses described herein are only used between management server 1001 and network access devices 1002 to exchange network management messages over the respective mTunnel(s). In this example, management server 1001 and network access devices 1002 using private IP addresses to exchange network management messages over mTunnel(s) 1021 forms a logical network 1023 (e.g., a logical management network).

Similarly, management server 1001 and network access devices 1003 of another organization in this example may utilize a different set of private or internal IP addresses to exchange network management messages through the respective mTunnel or mTunnels, where the private IP addresses may be in a different IP address space than the one of IP addresses used between network access devices 1003 and their client devices 1009. Similarly, in this example, management server 1001 and network access devices 1003 using private IP addresses to exchange network management messages over mTunnel(s) 1022 forms a logical network 1024 (e.g., a logical management network). The private IP addresses (referred to herein as a first set of private IP addresses) used between management server 1001 and network access devices 1002 may be different than the private IP addresses (referred to herein as a second set of private IP addresses) used between management server 1001 and network access devices 1003. The first and second sets of private IP addresses may be in different IP address spaces or in the same IP address space dependent upon the specific configuration.

According to one embodiment, when a network access device is powered up and initialized, the network access device performs certain self-configuration operations to determine whether the network access device should operate as a gateway or as an access point behind a gateway. In one embodiment, when a network access device boots up, it initializes its Ethernet interface and attempts to request an IP address (e.g., a publicly accessible IP address over the Internet, also referred to as an uplink IP address) by broadcasting its media access control (MAC) address within a dynamic host configuration protocol (DHCP) request via its Ethernet interface. If the Ethernet interface of this network access device is connected to the Internet, a DHCP server, which may be a separate server or part of management server 1001, will respond with a valid IP address assignment, and the network access device will operate as a gateway device. If there is no DHCP response received within a predetermined period of time, the network access device assumes that it is operating behind another gateway device that performs NAT, and the network access device then joins an existing network and operates as an access point.

According to one embodiment, when operating behind a gateway, each of the network access devices derives its own IP address and assigns IP addresses to its client devices using a predetermined method in a consistent manner. In one embodiment, a network access device performs a hash operation on at least a portion of its hardware identifier such as a MAC address to generate an IP address. In a particular embodiment, a network access device hashes its 6-byte MAC address using a predetermined hash function (e.g., CRC-32 hash function) to generate lower three bytes of its IP address. Note that each of the network access devices may generate two IP addresses for itself: 1) an IP address in a first IP address space (e.g., 6.x.x.x) solely for communicating network management messages with management server 1001 via an mTunnel; and 2) an IP address in a second IP address space (e.g., 10.x.x.x) for normal network traffic with its client devices.

Similarly, when a network client device, such as client devices 1008, requests an IP address, the associated network access device hashes a MAC address of the client device to derive an IP address for the client device. Since each of the network access devices performs the same hash operation using the same hash function on a MAC address of a client device, the client device can consistently obtain the same IP address from different network access devices. As a result, the client device can roam across different network access devices without having to change its IP address or to perform any address resolution protocol (ARP) related operations.

Figure 10B:
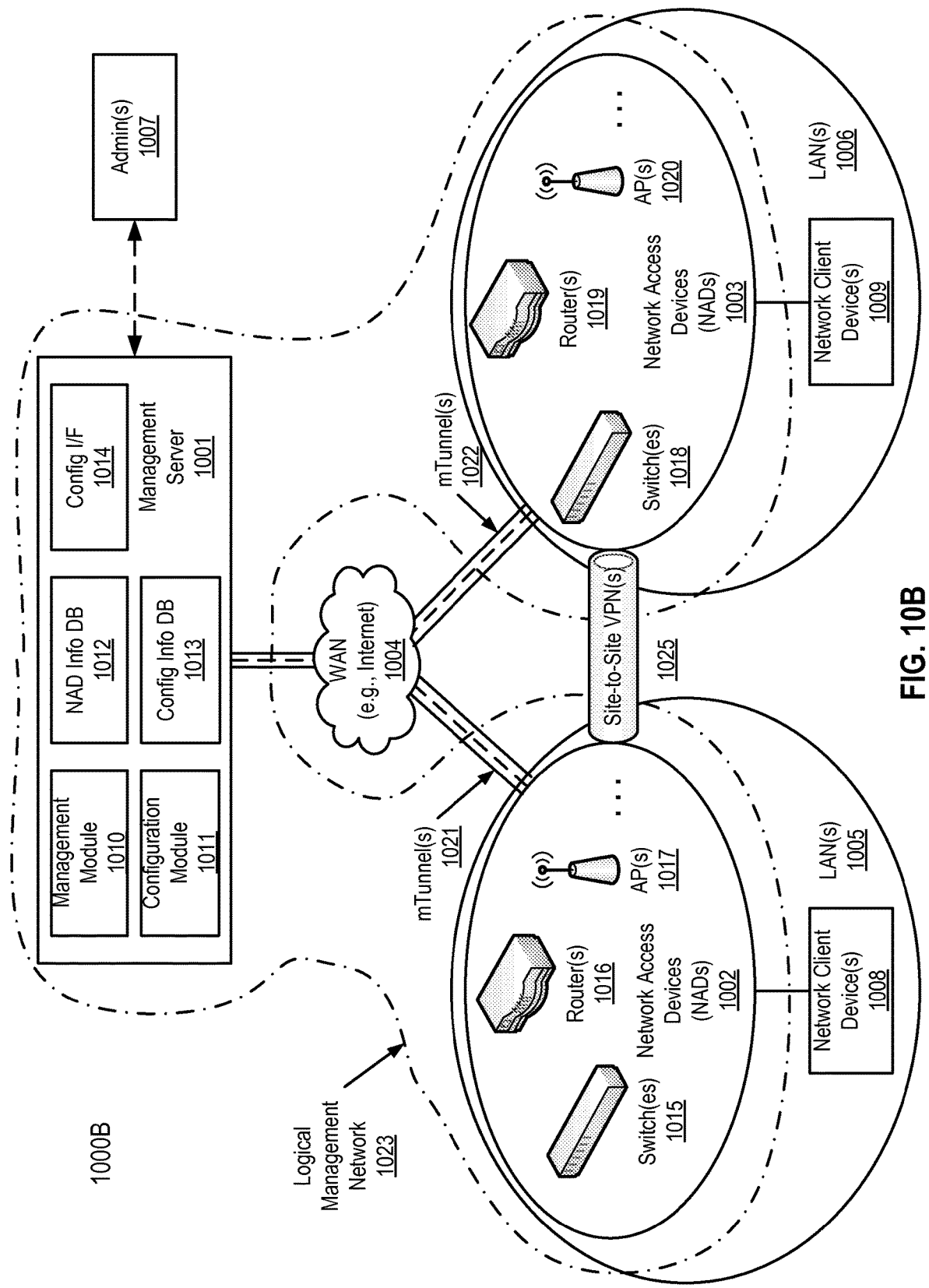

Referring back to FIG. 10A, as described above, network access devices 1002 and network access devices 1003 are associated with different organizations and managed by management server 1001. In other configurations, network access devices 1002 and network access devices 1003 may be associated with the same organization as shown as system 1000B in FIG. 10B. Referring to FIG. 10B, in this configurations, network access devices 1002 and network access devices 1003 may be deployed and located at different sites or geographical locations of the organization. According to one embodiment, at least one virtual private network (VPN) tunnel 1025 is maintained between at least one of network access devices 1002 and at least one of network access devices 1003, also referred to as a site-to-site VPN. Some or all of the network access devices can be configured, via configuration interface 1014, to participate in the site-to-site VPN.

Figure 11:
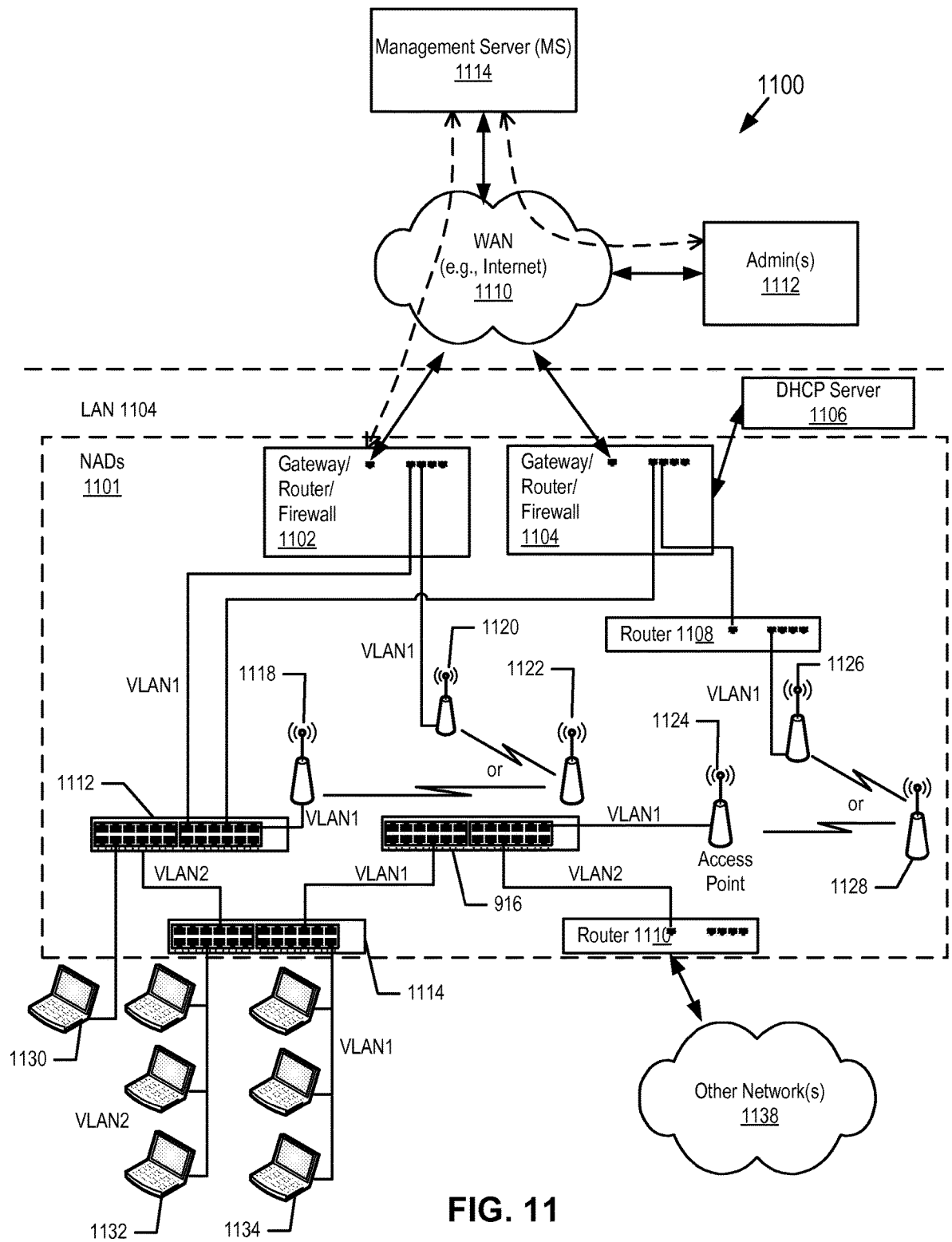
FIG. 11 is a block diagram illustrating a network configuration in accordance with another embodiment of the invention.

FIG. 11 is a block diagram illustrating a network configuration in accordance with an embodiment of the invention. Network configuration 1100 may be implemented as part of network configurations as shown in FIGS. 10A and 10B. The configuration of NADs 1101 represents one possible implementation of one of the LANs 1005 and 1006 of FIGS. 10A-10B, such as the one including an access network, where one or more of the NADs 1101 are in accordance with embodiments of the present invention. That is, any of the routers (e.g., 1102, 1104, 1108 and 1110), network switches (e.g., 1112-1114), and wireless access points (e.g., 1118-1128) shown in FIG. 11 may be implemented by way of the previously described network access devices, including NADs 1002 and 1003 of FIGS. 10A-10B. FIG. 11 illustrates the complexity and variety of possible configurations that may need to be accounted for by a system administrator (e.g., admin 1112) when configuring a network access device within LAN 1104. For example, LAN 1104 includes multiple gateways to WAN 1110, multiple VLANs, and multiple possible paths to WAN 1110 by many of the NADs 1101. A change in one of the NADs 1101 may require complex configuration changes to one or more of the downstream NADs. To be sure, a configuration change or fault in wireless access point 1120 may result in required configuration changes to wireless access points 1122 and 1118, and network switches 1112 and 1114. Similarly, a configuration change or fault in router 1108 may result in required configuration changes to wireless access points 1126, 1128, and 1124, network switches 1116 and 1114, and router 1110. As is apparent, manual configuration of the network access devices in a network such as LAN 1104 can be complex and extremely error prone. Furthermore, changes to LAN 1104 resulting in a loss of network connectivity may be difficult to diagnose and troubleshoot. Accordingly, embodiments of the present disclosure allow for an installer to install one or more of NADs 1101 by simply powering on the device and connecting a cable. Then, the NAD may automatically establish a connection to WAN 1110, such that Administrator 1112 may remotely configure NAD 1102 by way of management server 1114. Furthermore, NADs 1101 may be configured to periodically test their connection to WAN 1110 and if it is lost, to automatically establish a new connection to WAN 1110, so as to reduce down time of LAN 1104.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   determining, at a network access device communicating on a local area network and a wide area network (WAN), one or more characteristics of a device from which one or more network packets are received at the network access device;
   identifying, at the network access device, an access control rule for the device based on the one or more characteristics of the device;
   assigning, by the network access device, the access control rule to at least one of the device or network traffic associated with the device;
   reporting, by the network access device, the access control rule to a network management server to be propagated to other network access devices for use when the device roams on one or more of the other network access devices, the other network access devices not being part of the network in which the network access device operates, wherein information exchanged between devices attached to different corresponding local area networks and the local area network are exchanged via the WAN;
   before receiving, by the network access device, information originating from a roaming device not authorized to communicate, or authenticated with the local area network, receiving, from the network management server, propagated access control rules including a second access control rule of the roaming device communicating on and authenticated with the different corresponding local area network;
   receiving, at the network access device, a request from a roaming device to roam on the network access device subsequent to the receiving of the second access control rule; and
   in response to the request, providing, by the network access device, the authorization for network connectivity with the local area network for the roaming device according to the received second access control rule without re-authenticating the roaming device.

2. The method of claim 1, wherein the one or more characteristics of the device comprise an indication of a manufacturer of the device, wherein the manufacturer of the device is identified based on a media access control (MAC) address associated with the device.

3. The method of claim 1, wherein the one or more characteristics of the device comprise an indication of a device type associated with the device, wherein the access control rule for the device is identified from a plurality of rules based on the indication of the device type.

4. The method of claim 3, wherein the device type is identified based on at least one of dynamic host control protocol (DHCP) information associated with the device or a user agent identified in a header associated with the one or more network packets generated by the device.

5. The method of claim 3, wherein the indication of the device type comprises an indication of at least one of a type of operating system, a type of mobile device, or a type of wireless device, the access control rule being identified based on the at least one of the type of operating system, the type of mobile device, or the type of wireless device.

6. The method of claim 1, further comprising:
receiving at least one of the one or more network packets from the device;
selecting the access control rule assigned to the at least one of the device or the network traffic associated with the device; and
applying the access control rule to the at least one of the one or more network packets from the device.

7. The method of claim 1, further comprising:
sending, to one or more additional devices associated with the network, updated access control information comprising a first indication of the access control rule assigned to the at least one of the device or the network traffic associated with the device and a second indication of the one or more characteristics of the device.

8. The method of claim 1, wherein the access control rule comprises at least one of a bandwidth limit, a traffic shaping rule, a virtual local area network (VLAN) assignment, or a firewall rule.

9. A network access device comprising:
one or more processors; and
at least one non-transitory computer-readable storage medium having stored thereon instructions which, when executed by the one or more processors, cause the one or more processors to:
determine, a t the network access device that is communications on a local area network and a wile area network (WAN), one or more characteristics of a device from which one or more network packets are received at the network access device;
identify an access control rule for the device based on the one or more characteristics of the device;
assign the access control rule to at least one of the device or network traffic associated with the device;
report the access control rule to a network management server to be propagated to other network access devices for use when the device roams on one or more of the other network access devices, the other network access devices not being p art of the network in which the network access device operates, wherein information exchanged between devices attached to different corresponding local area networks and the local area network are exchanged via the WAN;
before receiving information originating from a roaming device not authorized to communicate, or authenticated with the local area network, receive, from the network management server, propagated access control rules including a second access control rule of the roaming device communicating on and authenticated with the different corresponding local area network;
receive a request from a roaming device to roam on the network access device subsequent to the receiving of the second access control rule; and
in response to the request, provide the authorization for network connectivity with the local area network for the roaming device according to the received second access control rule without re-authenticating the roaming device.

10. The network access device of claim 9, wherein the one or more characteristics of the device comprise an indication of a manufacturer of the device, wherein the manufacturer of the device is identified based on a media access control (MAC) address associated with the device.

11. The network access device of claim 9, wherein the one or more characteristics of the device comprise an indication of a device type associated with the device, wherein the access control rule for the device is identified from a plurality of rules based on the indication of the device type.

12. The network access device of claim 11, wherein the device type is identified based on at least one of dynamic host control protocol (DHCP) information associated with the device or a user agent identified in a header associated with the one or more network packets generated by the device.

13. The network access device of claim 11, wherein the indication of the device type comprises an indication of at least one of a type of operating system, a type of mobile device, or a type of wireless device, the access control rule being identified based on the at least one of the type of operating system, the type of mobile device, or the type of wireless device.

14. The network access device of claim 9, the at least one non-transitory computer-readable storage medium storing instructions which, when executed by the one or more processors, cause the one or more processors to:
receive at least one of the one or more network packets from the device;
select the access control rule assigned to the at least one of the device or the network traffic associated with the device; and
apply the access control rule to the at least one of the one or more network packets from the device.

15. The network access device of claim 9, the at least one non-transitory computer-readable storage medium storing instructions which, when executed by the one or more processors, cause the one or more processors to:
send, to one or more additional devices associated with the network, updated access control information comprising a first indication of the access control rule assigned to the at least one of the device or the network traffic associated with the device and a second indication of the one or more characteristics of the device.

16. The network access device of claim 9, wherein the access control rule comprises at least one of a bandwidth limit, a traffic shaping rule, a virtual local area network (VLAN) assignment, or a firewall rule.

17. At least one non-transitory computer-readable storage medium having stored thereon instructions which, when executed by one or more processors of a network access device, cause the network access device to:
determine, at the network access device that is communications on a local area network and a wide area network (WAN), one or more characteristics of a device from which one or more network packets are received at the network access device;
identify an access control rule for the device based on the one or more characteristics of the device;
assign the access control rule to at least one of the device or network traffic associated with the device;
report the access control rule to a network management server to be propagated to other network access devices for use when the device roams on one or more of the other network access devices, the other network access devices not being part of the network in which the network access device operates, wherein information exchanged between devices attached to different corresponding local area networks and the local area network are exchanged via the WAN;

before receiving information originating from a roaming device not authorized to communicate, or authenticated with the local area network, receive, from the network management server, propagated access control rules including a second access control rule of the roaming device communicating on and authenticated with the different corresponding local area network;

receive a request from a roaming device to roam on the network access device subsequent to the receiving of the second access control rule; and in response to the request, provide the authorization for network connectivity with the local area network for the roaming device according to the received second access control rule without re-authenticating the roaming device.

18. The at least one non-transitory computer-readable storage medium of claim 17, wherein the one or more characteristics of the device comprise an indication of a manufacturer of the device, wherein the manufacturer of the device is identified based on a media access control (MAC) address associated with the device.

19. The at least one non-transitory computer-readable storage medium of claim 17, wherein the one or more characteristics of the device comprise an indication of a device type associated with the device, wherein the access control rule for the device is identified from a plurality of rules based on the indication of the device type, and wherein the device type is identified based on at least one of dynamic host control protocol (DHCP) information associated with the device or a user agent identified in a header associated with the one or more network packets generated by the device.

20. The at least one non-transitory computer-readable storage medium of claim 19, wherein the indication of the device type comprises an indication of at least one of a type of operating system, a type of mobile device, or a type of wireless device, the access control rule being identified based on the at least one of the type of operating system, the type of mobile device, or the type of wireless device.

* * * * *